(12) United States Patent
Ariyapadi et al.

(10) Patent No.: US 8,377,154 B2
(45) Date of Patent: Feb. 19, 2013

(54) GASIFICATION SYSTEM AND PROCESS FOR MAXIMIZING PRODUCTION OF SYNGAS AND SYNGAS-DERIVED PRODUCTS

(75) Inventors: Siva Ariyapadi, Pearland, TX (US); Kamalkumar I. Gursahani, Houston, TX (US); Avinash Malhotra, Sugar Land, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 288 days.

(21) Appl. No.: 12/782,346

(22) Filed: May 18, 2010

(65) Prior Publication Data

US 2011/0210292 A1   Sep. 1, 2011

(51) Int. Cl.
*B01J 7/00* (2006.01)
*C01B 3/36* (2006.01)
*C01B 6/24* (2006.01)
*C01B 3/24* (2006.01)

(52) U.S. Cl. ............ 48/61; 48/197 R; 423/644; 423/650
(58) Field of Classification Search ........................ 48/61
See application file for complete search history.

(56) References Cited

U.S. PATENT DOCUMENTS

| | | | |
|---|---|---|---|
| 4,025,318 A | 5/1977 | Moody et al. | |
| 4,199,327 A | 4/1980 | Hempill et al. | |
| 4,524,581 A | 6/1985 | Cascone et al. | |
| 4,568,531 A | 2/1986 | van Dijk et al. | |
| 4,726,818 A | 2/1988 | Yeung et al. | |
| 4,792,441 A | 12/1988 | Wang et al. | |
| 4,822,521 A | 4/1989 | Fuderer | |
| 5,041,144 A | 8/1991 | Lath | |
| 5,132,007 A | 7/1992 | Meyer et al. | |
| 5,736,116 A | 4/1998 | LeBlanc et al. | |
| 5,980,858 A | 11/1999 | Fujimura et al. | |
| 6,282,880 B1 * | 9/2001 | Wallace et al. | 60/780 |
| 7,090,816 B2 | 8/2006 | Malhotra et al. | |
| 7,220,505 B2 | 5/2007 | Malhotra et al. | |
| 2002/0055545 A1 | 5/2002 | Sheppard et al. | |
| 2007/0214719 A1 | 9/2007 | Yoshikawa | |
| 2007/0217989 A1 | 9/2007 | Malhotra et al. | |
| 2008/0081844 A1 | 4/2008 | Shires et al. | |
| 2008/0161428 A1 * | 7/2008 | Strait | 518/702 |
| 2009/0136391 A1 | 5/2009 | Singh et al. | |

* cited by examiner

*Primary Examiner* — Matthew Merkling
(74) *Attorney, Agent, or Firm* — KBR IP Legal Dept.

(57) ABSTRACT

A gasification system and method. The system can include a gasifier and a purification unit fluidly coupled to the gasifier, with the purification unit receiving raw syngas from the gasifier and producing waste gas and a syngas product. The system can also include a first reformer fluidly coupled to the purification unit, with the first reformer receiving a first portion of the waste gas and producing reformed hydrocarbon. The system can further include a second reformer having a first inlet fluidly coupled to the purification unit, a second inlet fluidly coupled to the first reformer, and an outlet fluidly coupled to the purification unit. The second inlet can receive the reformed hydrocarbon from the first reformer, and the first inlet can receive a second portion of the waste gas from the purification unit. The second reformer can produce a recovered raw syngas that is directed to the purification unit.

12 Claims, 4 Drawing Sheets

GASIFICATION SYSTEM AND PROCESS FOR MAXIMIZING PRODUCTION OF SYNGAS AND SYNGAS-DERIVED PRODUCTS

BACKGROUND OF THE INVENTION

1. Field of the Invention

Embodiments of the present invention generally relate to systems, apparatus and processes for gasifying a hydrocarbon. More particularly, embodiments of the present invention relate to recovering and processing waste gas in a gasification system and/or process.

2. Description of the Related Art

The practice of producing electricity, syngas, ammonia, urea, and/or other products from a carbon-containing feedstock using various gasification processes is known. Typically, the carbon-containing feedstock, which can be natural gas, coal, biomass, organic waste, and/or the like, is fed to a gasifier. In the gasifier, the hydrocarbon can be pyrolyzed to create a carbonaceous char. Oxygen and/or steam can then be introduced into the gasifier at high temperature and can react with the carbonaceous char therein to produce raw syngas. The raw syngas can include varying ratios of hydrogen gas and carbon monoxide, along with methane, carbon dioxide, water vapor, and other constituents such as ammonia, nitrogen, hydrogen cyanide and the like.

The raw syngas produced in the gasifier is often further processed and purified to produce a usable syngas product. Conventional processing and purification can include shifting the syngas to convert carbon monoxide to hydrogen gas, removing carbon dioxide and/or sulfur, and/or purifying to remove other undesirable components from the raw syngas. Purifying can result in a waste gas, which can include valuable hydrocarbons, which is typically burned as fuel to help drive the gasification process. What is needed are efficient apparatus, systems, and methods for recovering and reforming the rejected components of the waste gas into additional syngas, instead of, or in addition to, using the waste gas as fuel.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Figure 1:
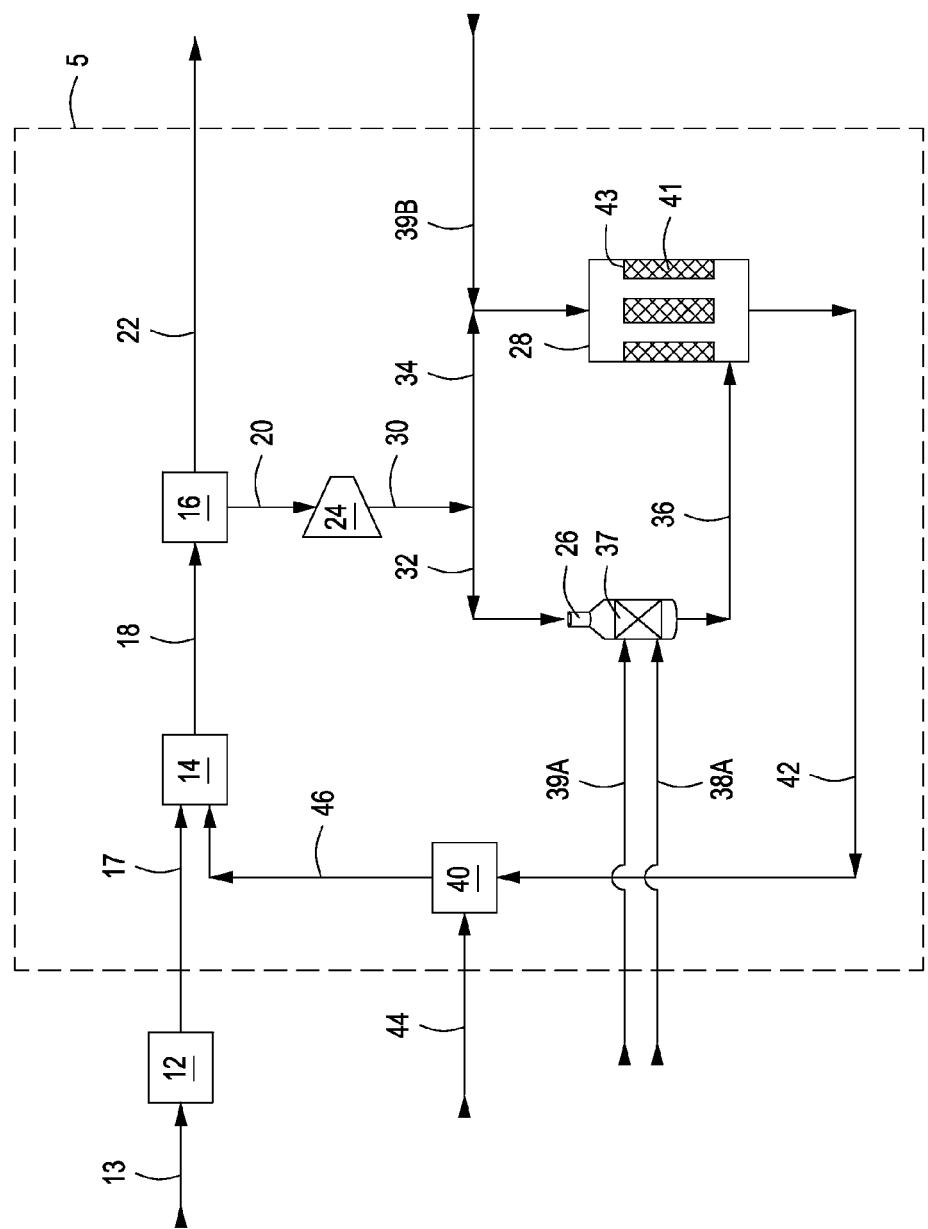
FIG. 1 depicts an illustrative syngas treatment system, according to one or more embodiments described.

FIG. 1 depicts an illustrative syngas treatment system 5, according to one or more embodiments. The syngas treatment system 5 can generally include an acid gas removal unit ("AGRU") 14 and a purification unit 16, which are fluidly coupled together via line 18. In one or more embodiments the syngas treatment system 5, specifically, the AGRU 14, can be coupled to a gasifier 12 via line 17. Although not shown, in one or more embodiments, additional components such as heat exchangers, mercury removal units, shift converters, and/or the like, can be interposed between, or included as part of, the gasifier 12, AGRU 14, and/or purification unit 16, as needed.

The gasifier 12 can receive a hydrocarbon via line 13, and can produce a raw syngas via line 17, which can then be received by the AGRU 14. The AGRU 14 can remove a carbon dioxide and/or sulfur portion from the raw syngas, and the remaining raw syngas can exit the AGRU 14 via line 18. The raw syngas via line 18 can be introduced to the purification unit 16. The purification unit 16 can separate the raw syngas via line 18 into a waste gas via line 20 and a syngas product via line 22. The waste gas via line 20 can include elements and compounds that are generally inert in downstream processes that use syngas. Such inert elements and compounds can include, but are not limited to, argon, nitrogen, and/or hydrocarbons such as methane, propane, butane, and others. The syngas product via line 22 can be transported from the syngas treatment system 5 to any downstream processes that employ syngas, such as ammonia or urea production, Fischer-Tropsch processing, and the like.

The syngas treatment system 5 can further include a blower or compressor 24, a first reformer 26, and a second reformer 28. The compressor 24 can receive the waste gas via line 20, and can compress it into a compressed waste gas via line 30. The compressed waste gas via line 30 can be split into first and second portions via lines 32 and 34, respectively. The first portion of the compressed waste gas via line 32 can be reformed in the first reformer 26 to create a first reformed hydrocarbon via line 36. The first reformer 26 can be, for example, an autothermal reformer ("ATR"), as is known in the art. Accordingly, the first reformer 26 can include one or more catalyst beds 37, which can facilitate and/or enable a reforming reaction therein. In one or more embodiments, steam via line 39A and/or oxygen, oxygen-enriched air, air, or another oxidant via line 38A can be introduced to the first reformer 26. The second portion of the compressed waste gas via line 34 can be introduced to the second reformer 28. The second portion of the compressed waste gas via line 34 can also be mixed with steam via line 39B, or the steam can be introduced within the second reformer 28. The second reformer 28 can be a shell-and-tube reformer, which can include one or more catalyst-filled tubes 41. The one or more catalyst-filled tubes 41 can include, but are not limited to, one or more fins, static mixers, rifling, heat conductive packing, turbulence-causing projections, or any combination thereof, disposed on the external surface and/or internal surface thereof. The one or more catalyst-filled tubes 41 can be of various types, for example, straight tubes, bayonet tubes, U-tubes, coiled tubes, or any combination thereof. In one or more embodiment, some, all, or none of the catalyst-filled tubes 41 can have the same shape, length, diameter, and/or cross sectional area. The one or more catalyst-filled tubes 41 can be disposed vertically, horizontally, or at any other angle in the second reformer 28.

In one or more embodiments, the catalyst-filled tubes 41 can be supported by one or more tube sheets 43. The one or more tube sheets 43 can separate a shell side of the second reformer 28 from a tube side thereof. As such, the second portion of the compressed waste gas via line 34 can enter the second reformer 28 on a tube side thereof and can proceed through the catalyst-filled tubes 41. The first reformed hydrocarbon in line 36 can be at high temperature and/or high pressure, and can provide a heat of reaction for the second reformer 28. Accordingly, the first reformed hydrocarbon in line 36 can enter the second reformer 28 on a shell side thereof. Using the heat provided by the first reformed hydrocarbon via line 36, the second reformer 28 can reform the second portion of the compressed waste gas via line 34 to produce a second reformed hydrocarbon, which can be combined with the first reformed hydrocarbon received from the first reformer 26 via line 36 to produce a recovered raw syngas via line 42.

In one or more embodiments, the syngas treatment system 5 can further include a shift converter 40 which can be fluidly coupled to the second reformer 28 to receive the recovered raw syngas via line 42. The shift converter 40 can alter or "shift" a ratio of hydrogen and carbon monoxide by introducing water to the recovered raw syngas via line 42, for example, in the presence of a catalyst. Accordingly, water can be introduced to the shift converter 40 via line 44. The water introduced via line 44 can have any temperature and/or flow rate necessary to achieve a desired hydrogen to carbon monoxide ratio. The shift converter 40 can thus shift the recovered raw syngas in line 42, which can then be transported to AGRU 14 via line 46.

In one or more embodiments, the recovered raw syngas via line 42 can be recombined with the raw syngas in the AGRU 14, or thereafter in line 18. In one or more other embodiments, the recovered raw syngas via line 42 can instead or, a portion thereof can additionally, be transported to the line 17 to mix with the raw syngas therein (not shown) and then introduced to the AGRU 14. In one or more other embodiments, the recovered raw syngas via line 46 can be introduced to one or more separate and/or dedicated AGRUs (not shown), and then introduced to the purification unit 16, or to a separate purification unit (not shown), to a storage vessel (not shown), or to any other device or structure suitable.

Accordingly, in one or more embodiments, the recovered raw syngas via line 42, derived from the waste gas, can be recycled to the purification unit 16 via the AGRU 14, thereby augmenting the raw syngas introduced via line 17, and ultimately the syngas product via line 22. This can increase syngas production efficiency of a gasification system implementing the syngas treatment system 5, as a higher percentage of the hydrocarbon introduced to the gasifier 12 can be processed into syngas product via line 22.

Referring again to the shift converter 40, a water-gas shift reaction therein can react at least a portion of the carbon monoxide in the recovered raw syngas introduced via line 42, with water in the presence of a catalyst and/or a high temperature to produce hydrogen and carbon dioxide. The shift converter 40 can include, but is not limited to, single-stage, adiabatic, fixed-bed reactors; multiple-stage, adiabatic, fixed-bed reactors, with inter-stage cooling, steam generation and/or cold quench reactors; tubular, fixed-bed reactors, with steam generation and/or cooling; fluidized bed reactors, or any combination thereof. A sorption-enhanced water-gas shift ("SEWGS") process, utilizing a pressure swing adsorption unit having multiple fixed bed reactors packed with shift catalyst and high temperature (e.g., about 475° C.) carbon dioxide adsorbent, can be used. Various shift catalysts can be employed. Carbon monoxide can be separated from the recovered raw syngas in line 42 and used for the production of chemicals, such as acetic acid, phosgene/isocyanates, formic acid, and propionic acid.

In one or more embodiments, the shift converter 40 can include two reactors arranged in series. For example, a first reactor can be operated at a high temperature of from about 350° C. to about 400° C. to convert a majority of the CO present in the recovered raw syngas introduced via line 42 to $CO_2$ at a relatively high reaction rate using a catalyst which can be, but is not limited to iron oxide, zinc ferrite, magnetite, chromium oxides, derivatives thereof, or any combination thereof. A second reactor can be operated at a relatively low temperature of about 150° C. to about 200° C. to complete the conversion of CO to $CO_2$ using a mixture of copper oxide and zinc oxide. The second reactor can use a catalyst that includes, but is not limited to copper, zinc, copper promoted chromium, derivatives thereof, or any combination thereof.

The recovered carbon dioxide from the shift converter 40 can be used in a fuel recovery process to enhance the recovery of oil and gas. In an illustrative oil recovery process, carbon dioxide can be injected and flushed into an area beneath an existing well where "stranded" oil exists. The water and carbon dioxide removed with the crude oil can then be separated and recycled.

Referring again to the AGRU 14, in one or more embodiments, the AGRU 14 can include one or more gas purification systems, process, and/or devices configured to remove acid gasses from the raw syngas in line 17 and also in line 46, as described in greater detail below. In one or more embodiments, amine treating can be used to remove hydrogen sulfide and carbon dioxide, for example, as is known in the art. In one or more embodiments, polymeric membranes can be used to separate the carbon dioxide and the hydrogen sulfide, as are known in the art. Illustrative acid gasses can include carbon dioxide, hydrogen sulfide, other sulfur containing compounds, mercaptans and/or the like. In one or more embodiments, the AGRU 14 can include, but is not limited to, catalytic gas purification systems using zinc titanate, zinc ferrite, tin oxide, zinc oxide, iron oxide, copper oxide, cerium oxide or mixtures thereof. The AGRU 14 can instead or also include, but is not limited to, process-based gas purification systems such as the Selexol™ process, the RECTISOL® process, the CRYSTASULF® process, and the SULFINOL® Gas Treatment Process.

Referring again to the purification unit 16, in one or more embodiments, the purification unit 16 can utilize pressure swing adsorption, nitrogen wash unit, cryogenic distillation, semi-permeable membranes, combinations thereof, and/or other purification processes. Absorbents used in the purification unit 16, where applicable, can include caustic soda, potassium carbonate or other inorganic bases, and/or alanolamines. Additional process conditions and other details can be found in U.S. Pat. No. 7,090,816 and U.S. patent application Ser. No. 11/472,590, both of which are herein incorporated by reference in the entirety, to the extent not inconsistent with this disclosure.

Figure 2:
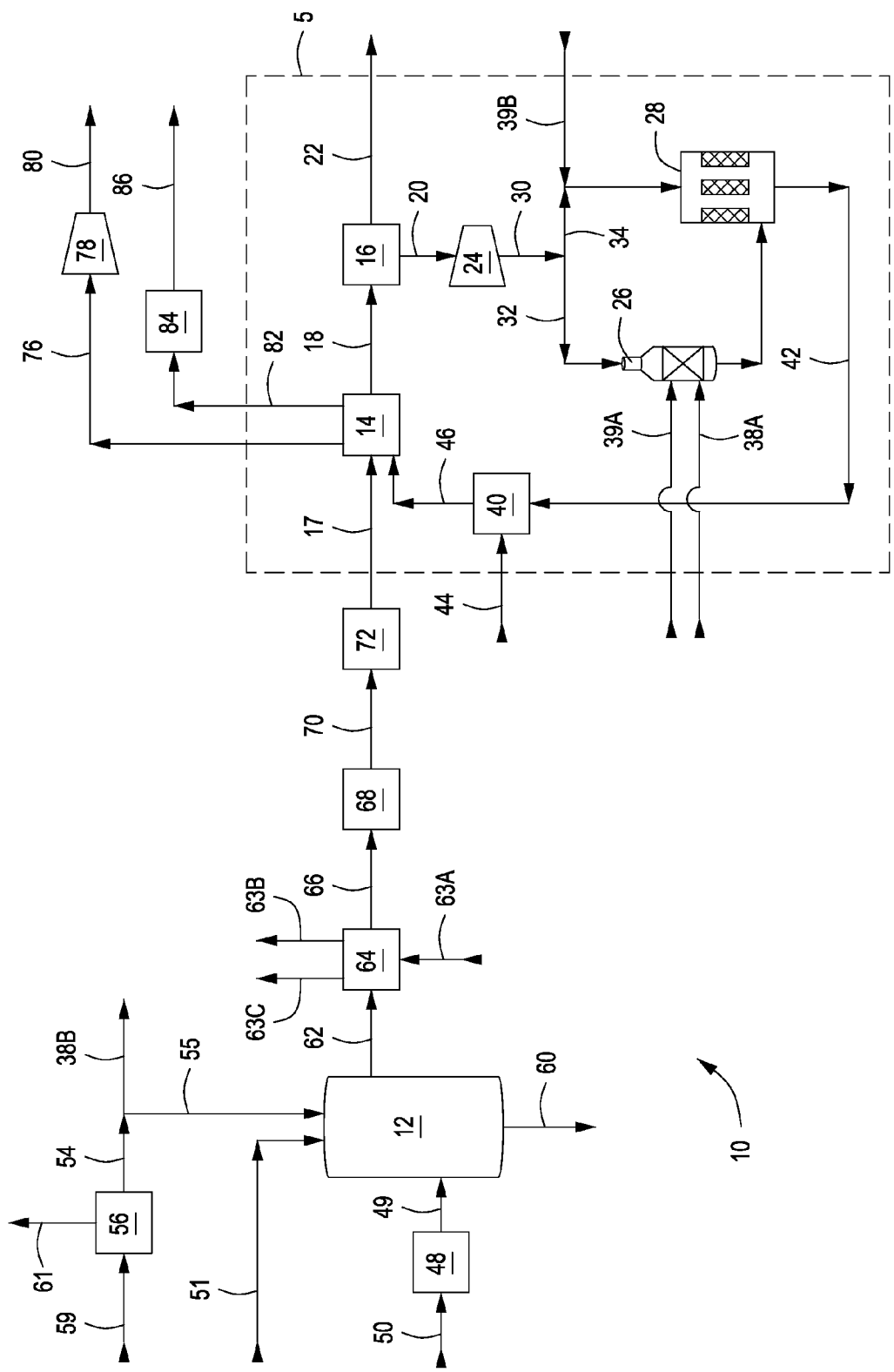
FIG. 2 depicts an illustrative gasification system, according to one or more embodiments described.

FIG. 2 depicts an exemplary gasification system 10, according to one or more embodiments. In one or more embodiments, the gasification system 10 can include the syngas treatment system 5 described above with reference to FIG. 1. Accordingly, the gasification system 10 can include the AGRU 14, purification unit 16, compressor 24, first and second reformers 26, 28, and shift gas unit 40, which can be coupled to the gasifier 12.

In one or more embodiments, the gasification system 10 can also include a hydrocarbon preparation unit 48. The hydrocarbon preparation unit 48 can receive a hydrocarbon via line 50. The hydrocarbon in line 50 can include a carbonaceous material, whether solid, liquid, gas, or a combination thereof. The carbonaceous materials can include but are not limited to, biomass (e.g., plant and/or animal matter or plant and/or animal derived matter); coal (e.g., high-sodium and low-sodium lignite, lignite, sub-bituminous, and/or anthracite); oil shale; coke; tar; asphaltenes; low ash or no ash polymers; hydrocarbon-based polymeric materials; biomass derived material; or by-product derived from manufacturing operations. The hydrocarbon-based polymeric materials can include, for example, thermoplastics, elastomers, rubbers, including polypropylenes, polyethylenes, polystyrenes, including other polyolefins, homo polymers, copolymers, block copolymers, and blends thereof; PET (polyethylene terephthalate), poly blends, other polyolefins, poly-hydrocarbons containing oxygen; heavy hydrocarbon sludge and bottoms products from petroleum refineries and petrochemical plants such as hydrocarbon waxes, blends thereof, derivatives thereof, and combinations thereof.

The hydrocarbon in line 50 can include a mixture or combination of two or more carbonaceous materials. For example, the hydrocarbon can include a mixture or combination of two or more low ash or no ash polymers, biomass-derived materials, or by-products derived from manufacturing operations. The hydrocarbon can include one or more carbonaceous materials combined with one or more discarded consumer products, such as carpet and/or plastic automotive parts/components including bumpers and dashboards. Such discarded consumer products can be reduced in size to fit within the gasifier 12. The feedstock can include one or more recycled plastics such as polypropylene, polyethylene, polystyrene, derivatives thereof, blends thereof, or any combination thereof. Accordingly, the process can be useful for accommodating mandates for proper disposal of previously manufactured materials.

In one or more embodiments, the hydrocarbon preparation unit 48 can be any preparation unit known in the art, depending on the hydrocarbon in line 50 and the desired syngas product in line 22. In one or more embodiments, the hydrocarbon preparation unit 48 can remove contaminants from the hydrocarbon in line 50, for example, by washing away dirt or other undesired portions. In one or more embodiments, the hydrocarbon via line 50 can be a dry feed or conveyed to the hydrocarbon preparation unit 48 as a slurry or suspension. In one or more embodiments, the hydrocarbon via line 50 can be dried, for example, to about 18% moisture, and then pulverized by milling units (not shown) such as one or more parallel bowl mills in the hydrocarbon preparation unit 48. The hydrocarbon via line 50 can have an average particle diameter size of from about 50 microns, about 150 microns, or about 250 microns to about 400 microns or about 500 microns or larger.

The hydrocarbon preparation unit 48 can thus produce a prepared hydrocarbon via line 49. The prepared hydrocarbon via line 49 can be introduced to the gasifier 12 for gasification. In one or more embodiments, one or more sorbents can also be added to the gasifier 12. The one or more sorbents can be added to capture contaminants from the raw syngas, such as sodium vapor in the gas phase within the gasifier 12. The one or more sorbents can be added to scavenge oxygen at a rate and level sufficient to delay or prevent the oxygen from reaching a concentration that can result in undesirable side reactions with hydrogen (e.g., water) from the feedstock within the gasifier 12. The one or more sorbents can be mixed or otherwise added to the one or more hydrocarbons. The one or more sorbents can be used to dust or coat the hydrocarbon feedstock particles in the gasifier 12 to reduce the tendency for the particles to agglomerate. The one or more sorbents can be ground to an average particle size of about 5 microns to about 100 microns, or about 10 microns to about 75 microns. Illustrative sorbents can include but are not limited to, carbon-rich ash, limestone, dolomite, and coke breeze. Residual sulfur released from the feedstock can be captured by native calcium in the feed or by a calcium-based sorbent to form calcium sulfide.

In one or more embodiments, the gasifier 12 can be a counter-current fixed bed gasifier, a co-current fixed bed gasifier, a fluidized bed reactor, an entrained flow gasifier, or any other type of gasifier. The gasifier 12 can produce a raw syngas via line 62, while waste from the gasifier 12, such as ash, can be removed via line 60. The waste via line 60 can be disposed of or can be used in other applications. In one or more embodiments, steam via line 51 can be introduced to the gasifier 12 to support the gasification process. In one or more embodiments, however, the gasifier 12 may not require direct steam introduction via line 51.

In one or more embodiments, pure oxygen, nearly-pure oxygen, essentially-pure oxygen, or oxygen-enriched air from an air separation unit ("ASU") 56 can provide a nitrogen-lean and oxygen-rich gas (hereafter "oxidant") via line 54. The ASU 56 can be any air separation unit known in the art, for example, a high-pressure cryogenic-type separator. The ASU 56 can remove at least a nitrogen component via line 61 from air received via an air intake 59. The separated nitrogen via line 61 from the ASU 56 can be added to a combustion turbine (not shown) and/or can be used to produce ammonia, urea, other ammonia-derived products, or used in other applications.

The oxidant via line 54 can be split and directed through line 38B and line 55. Line 55 can be coupled to the gasifier 12, thereby providing at least a portion of the oxidant thereto. The use of pure or nearly-pure oxygen gas as the oxidant via line 55 can allow the gasifier 12 to produce raw syngas via line 62 that can be essentially nitrogen-free, e.g., containing less than about 0.5% nitrogen and/or argon. Line 38B can be coupled to line 38A thereby providing oxidant via lines 38B and 38A to the first reformer 26, although the coupling is not shown in FIG. 2. Accordingly, in at least one specific embodiment, a single ASU 56 can provide the oxidant for both the first reformer 26 and the gasifier 12. In one or more embodiments, the ASU 56 can provide from about 10%, about 30%, about 50% about 70%, about 90%, or about 100% of the total oxidant fed to the gasifier 12. In one or more embodiments, the ASU 56 can provide from about 10%, about 30%, about 50% about 70%, about 90%, or about 100% of the total oxidant fed to the first reformer 26 via lines 38A and 38B.

In one or more other embodiments, multiple ASUs may be employed, for example, one ASU dedicated to the gasifier 12 and one to the first reformer 26. In one or more embodiments, the ASU 56 may be omitted, and can be replaced with an air compressor or blower 56, for example. Furthermore, in one or more embodiments in which the ASU 56 is omitted, ambient or otherwise processed, e.g., compressed, air can provide the oxidant for the gasifier 12, for example, as described in U.S. patent application Ser. No. 11/751,242, the entirety of which is herein incorporated by reference, to the extent not inconsistent with this disclosure. In one or more embodiments, the ASU 56 may be omitted, as the oxidant requirements of the gasifier 12 can be met by the steam provided via line 51. In one or more embodiments, the steam via line 51 can be mixed with the oxidant via lines 54, 55, 38A, and/or 38B.

In one or more embodiments, the raw syngas via line 62 can be introduced to a cooling unit 64. The cooling unit 64 can include one, two, three, or more heat exchangers or heat exchanging zones (none shown) arranged in series or parallel, or a combination thereof. In one or more embodiments, the raw syngas via line 62 can be cooled by indirect heat exchange in the first heat exchanger to a temperature of from about 260° C. to about 820° C. The raw syngas exiting the first heat exchanger can be further cooled by indirect heat exchange in the second heat exchanger to a temperature of from about 260° C. to about 704° C. The raw syngas exiting the second heat exchanger can be further cooled by indirect heat exchange in the third heat exchanger to a temperature of from about 260° C. to about 427° C. In one or more embodiments, the cooling unit 64 can include a water quench tower (not shown) in which the raw syngas exiting the gasifier 12 can be cooled by direct contact with water, for example, instead of heat exchangers.

A heat transfer medium via line 63A can be introduced to the cooling unit 64. The heat transfer medium via line 63A can be process water, boiler feed water, a refrigerant, or the like. Heat from the raw syngas via line 62 can be indirectly transferred to the heat transfer medium via line 63A to provide superheated or high-pressure superheated steam, which can be recovered via line 63B. In one or more embodiments, the superheated or high-pressure superheated steam via line 63B can be used to power one or more steam turbines (not shown). In one or more embodiments, the superheated or high-pressure superheated steam via line 63B can be directed to line 39A and/or line 39B to provide steam for the first and/or second reformers 26, 28 and/or line 51 to provide the steam for the gasifier 12.

In one or more embodiments, the superheated or high-pressure superheated steam via line 63B from the cooling unit 64 can have a temperature of about 400° C. or more, about 425° C. or more, about 450° C. or more, about 475° C. or more, about 500° C. or more, or about 550° C. or more. The superheated or high pressure superheated steam via line 63B can have a pressure of about 25 bar or more, about 50 bar or more, about 75 bar or more, about 100 bar or more, about 125 bar or more, about 200 bar or more, about 250 bar or more, or about 300 bar or more.

The raw syngas cooled in the cooling unit 64 can be introduced to one or more shift converters 68 via line 66. In one or more embodiments, the shift converter 68 can be the same unit as the shift converter 40. In one or more embodiments, the shift converters 40 and 68 can be distinct shift converters, and/or can each represent multiple shift converters. In one or more embodiments in which the shift converters 40, 64 are separate units, the shift converter 64 can be substantially similar to one or more embodiments of the shift converter 40 described above. In other embodiments, the shift converter 64 can be any type of shift converter including sour shift and sweet shift and can include any number of high, low, or medium-temperature shift converters, as are known in the art, with any number of reactors, in any configuration, with any type of catalyst suitable, where applicable.

The raw syngas shifted in the shift converter 68 can be introduced to a mercury removal unit 72 via line 70. The mercury removal unit 72, which can be any mercury removal unit known in the art, can remove mercury from the raw syngas via line 70 and safely disposed of it or provide it for use in other applications. For example, the mercury removal unit 72 can include a bed, or any other configuration or structure, of activated carbon, which can adsorb the mercury from the raw syngas in line 70. Alternatively, or additionally, the mercury removal unit 72 can include molecular sieves to remove the mercury, as are known in the art.

The raw syngas can exit the mercury removal unit 72 via line 17, and can be directed to the syngas treatment system 5, more particularly, to the AGRU 14. The AGRU 14 can remove sulfur and carbon dioxide from the raw syngas via lines 17 and/or 46, as described above with reference to FIG. 1. Accordingly, a carbon dioxide portion can be removed via line 76.

The carbon dioxide portion via line 76 can be introduced to a $CO_2$ compressor 78. The $CO_2$ compressor 78 can be any compressor suitable, or can include any configuration of multiple compressors of any suitable type. Suitable compressors can include, but are not limited to, centrifugal compressors, axial flow compressors, reciprocating compressors, combinations thereof, trains thereof, and/or the like. The $CO_2$ compressor 78 can produce a compressed carbon dioxide via line 80 which can be sent to storage for use in enhanced oil recovery processes, or transported out of the gasification system 10 for other applications.

A sulfuric component of the raw syngas via lines 46 and/or 17 can be removed by the AGRU 14 via line 82. The sulfuric component via line 82 can be recovered in a sulfur recovery unit 84. The sulfur recovery unit 84 can be any sulfur recovery unit 84 known in the art. For example, the sulfur recovery unit 84 can include devices implementing the Claus process or other processes. In one or more embodiments, the sulfur recovery unit 84 can include one or more heaters, condensers, and/or catalyst beds. The sulfur recovery unit 84 can produce a recovered sulfur 86, which can be elemental sulfur for use in applications such as manufacturing sulfuric acid, fertilizers, and/or other products.

In one or more embodiments, the raw syngas can exit the AGRU 14 via line 18. The raw syngas via line 18 can be introduced to the purification unit 16. The purification unit 16 can separate the raw syngas into a waste gas via line 20 and a syngas product via line 22, as described above with reference to FIG. 1. In one or more embodiments, the recovered the waste gas via line 20 can be compressed, reformed, and/or shifted in the syngas treatment system 5 to produce recovered raw syngas via line 46, as described above with reference to FIG. 1.

In one or more embodiments, the syngas product via line 22 can be coupled to a gas converter (not shown) for producing a syngas-derived product. For example, the syngas product in line 22 can be used to produce one or more Fischer-Tropsch ("F-T") products, including refinery/petrochemical feedstocks, transportation fuels, synthetic crude oil, liquid fuels, lubricants, alpha olefins, waxes, and so on. The reaction can be carried out in any type reactor, e.g., fixed bed, moving bed, fluidized bed, slurry, bubbling bed, etc using copper, ruthenium, iron or cobalt based catalysts, or combination thereof, under conditions ranging from about 190° C. to about 450° C., depending on the reactor configuration. Additional reaction and catalyst details can be found in U.S. patent application Ser. No. 11/109,122 and U.S. Pat. Nos. 5,621, 155; 6,682,711; 6,331,575; 6,313,062; 6,284,807; 6,136,868; 4,568,663; 4,663,305; 5,348,982; 6,319,960; 6,124,367; 6,087,405; 5,945,459; 4,992,406; 6,117,814; 5,545,674 and 6,300,268, the entirety of each being herein incorporated by reference, to the extent not inconsistent with this disclosure.

The F-T products are liquids, which can be shipped to a refinery site for further chemically reacting and upgrading to a variety of products. Certain products, e.g., $C_4$-$C_5$ hydrocarbons, can be high quality paraffin solvents which, if desired, can be hydrotreated to remove olefin impurities, or employed without hydrotreating to produce a wide variety of wax products. Liquid hydrocarbon products of C16+ can be upgraded by various hydroconversion reactions, e.g., hydrocracking, hydroisomerization catalytic dewaxing, isodewaxing, etc. or combinations thereof, to produce mid-distillates, diesel and jet fuels such as low freeze point jet fuel, high cetane jet fuel, etc. isoparaffinic solvents, lubricants, e.g., lube oil blending components and lube oil base stocks suitable for transportation vehicles, non-toxic drilling oils suitable for use in drilling muds, technical and medicinal grade white oil, chemical raw materials, and various specialty products.

In one or more embodiments, the gas converter can be used to produce methanol, alkyl formates, dimethyl ether, ammonia, acetic anhydride, acetic acid, methyl acetate, acetate esters, vinyl acetate and polymers, ketenes, formaldehyde, dimethyl ether, olefins, derivatives thereof, and/or combinations thereof. For methanol production, for example, the Liquid Phase Methanol Process can be used (LPMEOH™). In this process, the carbon monoxide in the syngas product via line 22 can be directly converted into methanol using a slurry bubble column reactor and catalyst in an inert hydrocarbon oil reaction medium which can conserve heat of reaction while idling during off-peak periods for a substantial amount of time while maintaining good catalyst activity. Additional details can be found in U.S. patent application Ser. No. 11/311,766 and Heydorn, E. C., Street, B. T., and Kornosky, R. M., "Liquid Phase Methanol (LPMEOH™) Project Operational Experience," (Presented at the Gasification Technology Council Meeting in San Francisco on Oct. 4-7, 1998), which are both herein incorporated by reference in the entirety to the extent not inconsistent with this disclosure. Gas phase processes for producing methanol can also be used. For example, known processed using copper based catalysts, the Imperial Chemical Industries process, the Lurgi process and the Mitsubishi process can be used.

For ammonia production, the gas converter can be adapted to operate the Haber-Bosch process described in LeBanc et al. in "Ammonia," *Kirk-Othmer Encyclopedia of Chemical Technology*, Volume 2, 3rd Edition, 1978, pp., 494-500, the entirety of which is herein incorporated by reference, to the extent not inconsistent with this disclosure. For alkyl formate production, such as for example, methyl formate, any of several processes wherein carbon monoxide and methanol are reacted in either the liquid or gaseous phase in the presence of an alkaline catalyst or alkali or alkaline earth metal methoxide catalyst can be used. Additional details can be found in U.S. Pat. Nos. 3,716,619; 3,816,513; and 4,216,339, the entirety of each being herein incorporated by reference, to the extent not inconsistent with this disclosure.

Figure 3:
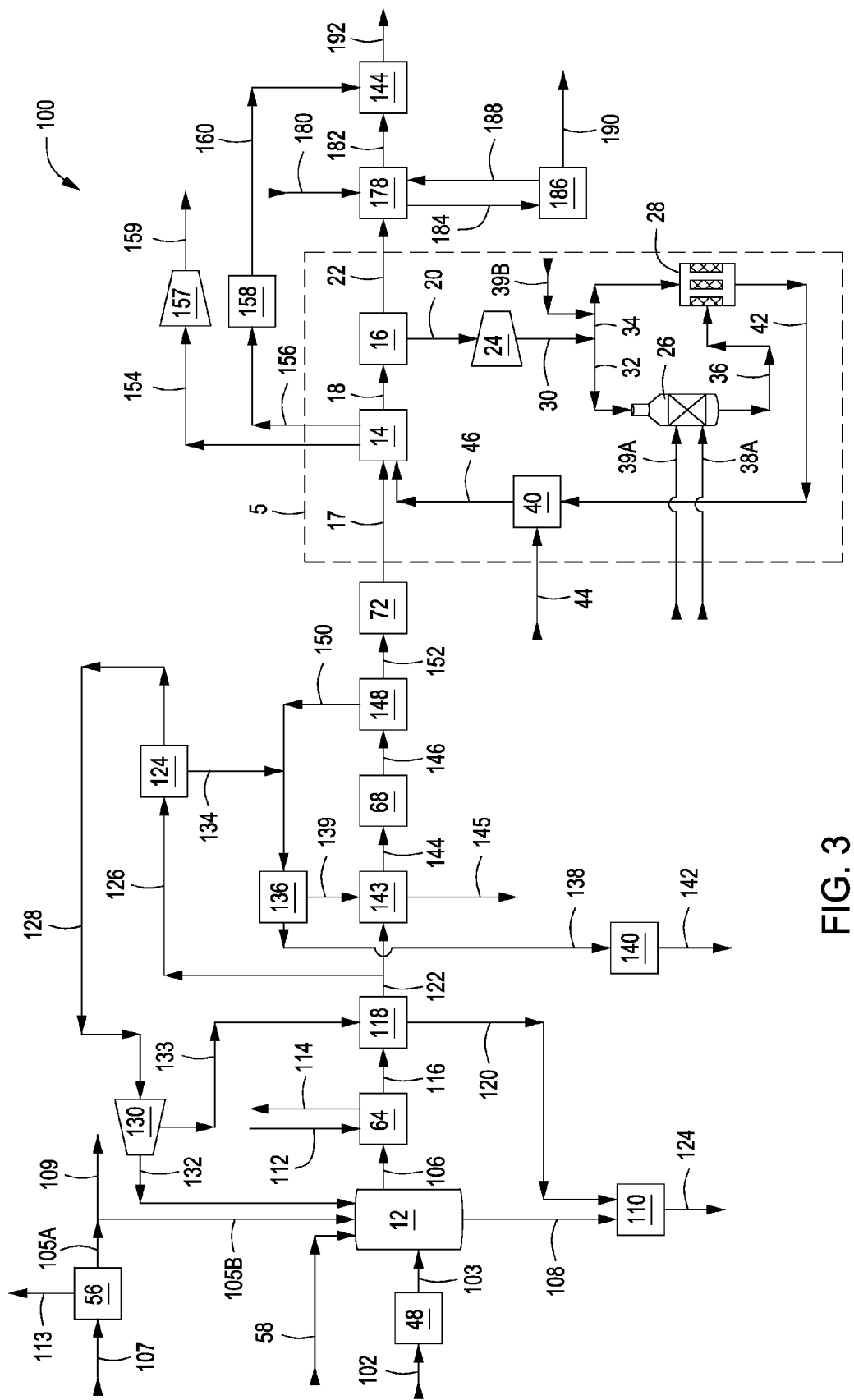
FIG. 3 depicts another illustrative gasification system, according to one or more embodiments described.

FIG. 3 depicts a schematic view of an exemplary gasification system 100, which implements the syngas treatment system 5 and, in one or more embodiments, can be suitable for ammonia and ammonia-derivatives production. The gasification system 100 can include the gasifier 12, the AGRU 14, the purification unit 16, the compressor 24, the first and second reformers 26, 28, the shift converter 40, the hydrocarbon preparation unit 48, the ASU 56, the cooling unit 64, and the shift converter 68, as described above with reference to FIGS. 1 and 2.

A hydrocarbon via line 102 can be introduced to the hydrocarbon preparation unit 48. The hydrocarbon in line 102 can be introduced at a rate of from about 100,000 kg/hr, 130,000 kg/hr, or about 160,000 kg/hr to about 170,000 kg/hr, about 200,000 kg/hr, or about 230 kg/hr. The hydrocarbon in line 102 can have a temperature of from about 25° C., about 30° C., or about 35° C. to about 40° C., about 45° C., or about 50° C. The hydrocarbon in line 102 can have a pressure of from about 35 bar, about 40 bar, or about 45 bar to about 50 bar, about 55 bar, or about 60 bar.

Prepared hydrocarbon can exit the hydrocarbon preparation unit 48 via line 103, and can be introduced to the gasifier 12. The gasifier 12 can be any gasifier 12 known that is suitable for gasifying a carbonaceous hydrocarbon feed to a raw syngas with a high nitrogen concentration, for example. In one or more embodiments, the gasifier 12 can be similar to that described in U.S. patent application Ser. No. 11/781,328, the entirety of which is herein incorporated by reference to the extent not inconsistent with this disclosure. In one or more embodiments, the gasifier 12 can be a TRIG™ gasifier commercially available from Kellogg Brown & Root, LLC.

Oxidant via line 105A can be produced by the ASU 56, which can draw in air via line 107, and remove, for example, nitrogen ($N_2$) via line 113 therefrom. The oxidant via line 105A can be split such that a first portion is directed to line 105B and a second portion is directed to line 109. Although not shown, the line 109 can be coupled to the first reformer 26 via line 38A, thereby allowing the ASU 56 to provide the oxidant for the first reformer 26. Also not shown, the oxidant via lines 105A, 105B, 109, and/or 39A can also be compressed and/or heated, using one or more compressors and/or heating elements or exchangers, respectively, either of which can be of any suitable type. The nitrogen via line 113 can be introduced to an ammonia synthesis unit 178, as described below. A portion of the nitrogen via line 113 can also or instead be exported at high or low pressure for use in other applications.

In one or more embodiments, the oxidant via line 105A can have a nitrogen ($N_2$) concentration of from about 0.10 mol %, about 0.12 mol %, or about 0.14 mol % to about 0.16 mol %, about 0.18 mol %, or about 0.20 mol %. The oxidant via line 105A can have an argon concentration of from about 0.22 mol %, about 0.27 mol %, or about 0.32 mol % to about 0.37 mol %, about 0.42 mol %, or about 0.47 mol %. The oxidant via line 105A can have an oxygen ($O_2$) concentration of about 90 mol % or more, about 95 mol % or more, about 99 mol % or more, about 99.5 mol % or more, or about 99.68 mol % or more. The oxidant via line 105A can have a temperature of from about 20° C., about 23° C., or about 26° C. to about 29° C., about 32° C., or about 35° C. The oxidant via line 105A can have a pressure of from about 35 bar, about 40 bar, or about 45 bar to about 50 bar, about 55 bar, or about 60 bar. The oxidant via line 105A can have a mass flow rate of about 60,000 kg/hr, about 70,000 kg/hr, or about 80,000 kg/hr to about 85,000 kg/hr, about 95,000 kg/hr, or about 105,000 kg/hr.

In one or more embodiments, the oxidant via line 38A can have a mass flow rate of from about 4,000 kg/hr, about 5,000 kg/hr, or about 6,000 kg/hr to about 7,000 kg/hr, about 8,000 kg/hr, or about 9,000 kg/hr. As such, the mass flow rate of the oxidant via line 105B can be proportional to the oxidant via line 105A less the mass flow rate of the oxidant via line 38A. The oxidant via line 38A can have a temperature of from about 125° C., about 135° C., about 145° C. to about 155° C., about 165° C., or about 175° C. The oxidant via line 38A can have a pressure of from about 25 bar, about 30 bar, about 35 bar to about 40 bar, about 45 bar, about 50 bar.

Referring again to the gasifier 12, the gasifier 12 can receive the prepared hydrocarbon via line 103, the oxidant via line 105B, and/or steam via line 58, and can produce raw syngas via line 106 and waste, for example, ash, via line 108. The raw syngas via line 106 can be introduced to the cooling unit 64. The waste via line 108 can be introduced to an ash removal, storage, and loading facility 110.

The cooling unit 64 can receive a boiler feed water ("BFW") via line 112 from any source of water. The BFW via line 112 can indirectly cool the raw syngas received by the cooling unit 64 via line 106. The BFW via line 112 can thus be vaporized into, for example, high-pressure steam via line 114. The high-pressure steam can be exported from the gasification system 100 via line 114, for use in other applications or sale to steam consumers. In one or more embodiments, the high-pressure steam via line 114 can be introduced to the first and/or second reformers 26, 28 via line 38A and/or line 39A, respectively, and can provide some or all of the steam requirements of the first and second reformers 26, 28.

The raw syngas can exit the cooling unit 64 via line 116 and can be introduced to a separation unit 118, such as a hot gas filter using metallic (e.g., Fe—Al) or ceramic filter candles, as are known in the art. The separation unit 118 can utilize any suitable filtration process and/or device, such as metal, ceramic, polymeric, or other materials disposed in membranes, meshes, or other types of filters. The separation unit 118 can separate a waste via line 120 from the raw syngas, and the remaining raw syngas can exit the separation unit 118 via line 122.

In one or more embodiments, the waste via line 120 can include a relatively fine ash compared to the ash that can be included in the waste via line 108. The waste via line 120 can be introduced to the ash removal, storage, and loading facility 110 and can combine or remain segregated from the waste via line 108. The ash removal, storage, and loading facility 110 can export a waste product via line 124 for disposal, or the waste product via line 124 can be recycled and used in any process. The waste product via line 124 can have a mass flow rate of from about 30,000 kg/hr, about 35,000 kg/hr, or about 40,000 kg/hr to about 45,000 kg/hr, about 50,000 kg/hr, or about 55,000 kg/hr. The waste product via line 124 can have a temperature of from about 10° C., about 15° C., or about 20° C. to about 25° C., about 30° C., or about 35° C. The waste product via line 124 can have a pressure of from about 0.7 bar, about 0.8 bar, or about 0.9 bar to about 1.1 bar, about 1.2 bar, or about 1.3 bar.

In one or more embodiments, after exiting the separation unit 118, ammonia in the raw syngas via line 122 can be recovered in an ammonia recovery process or system. Accordingly, a portion of the raw syngas in line 122 can be introduced or "purged" to a heat recovery unit 124 via line 126. Heat from the raw syngas in line 126 can be transferred to a heat transfer medium, such as water, a refrigerant, or the like in the heat recovery unit 124. The heat can then be transferred via the heat transfer medium for use in other processes, or to provide a heat of reaction for the first and/or second reformers 26, 28, the gasifier 12, or to heat steam to drive a turbine (not shown), or the like. The heat recovery unit 124 can produce an ammonia-depleted syngas via line 128, and an ammonia-rich condensate via line 134. The ammonia-depleted syngas via line 128 can be introduced to a compressor 130, which can be any compressor suitable, for example, a centrifugal compressor, a reciprocating compressor, combinations thereof, or the like. A first compressed portion of the ammonia-depleted syngas can exit the compressor 130 via line 132 and can be re-introduced to the gasifier 12. A second portion of the ammonia-depleted syngas can exit the compressor 130 via line 133 and can be re-introduced to the separation unit 118.

The ammonia-rich condensate via line 134 can be introduced to a pre-treatment unit 136. The ammonia-rich condensate via line 134 can include carbon dioxide, water vapor, and/or other elements, along with the ammonia. The pre-treatment unit 136 can include one or more heat exchangers (e.g., water heaters), condensers, flashing units, or the like (not shown), which can separate the ammonia via line 138 from the ammonia-rich condensate, leaving a second condensate via line 139. The second condensate via line 139 can be introduced to a saturation unit 143. The ammonia via line 138 can be introduced to an ammonia purification unit 140.

The ammonia purification unit 140 can include any condensers, filters, solvents, or the like as necessary to remove any impurities from the ammonia-rich condensate via line 138. In one or more embodiments, the ammonia purification unit 140 can remove and/or recycle at least a portion of any unreacted hydrogen, nitrogen, argon, carbon dioxide, carbon monoxide, methane, water, or any other non-ammonia contents of the ammonia rich stream via line 138. Ammonia can exit the ammonia purification unit 140 via line 142, and can be exported from the gasification system 100 for further processing and/or use in applications requiring ammonia. Although the coupling is not shown, in one or more embodiments, the line 142 can couple the ammonia purification unit 140 to an ammonia derivative plant 144, which can produce, for example, urea, as described in greater detail below.

Referring back to the raw syngas via line 122, the portion thereof not purged via line 126 can be introduced to the saturation unit 143. The saturation unit 143 can be any device or process suitable for increasing water content in the raw syngas in line 122 using condensate in line 139. In one or more embodiments, the saturation unit 143 can include a water tower with packing to enhance gas-liquid contact. In one or more embodiments, the saturation unit 143 may also include one or more heat exchangers to saturate and/or vaporize water and add it in gaseous form to raw syngas exiting the saturation unit 143 via line 144. The raw syngas via line 144 and can be introduced to the shift converter 68. A condensate can also exit the saturation unit 143 via line 145, and can be exported from the gasification system 100 to a sour water stripper, as is known in the art.

The shift converter 68 can be a "sour shift converter," as is known in the art. In one or more embodiments, the shift converter 68 can reheat the raw syngas, and introduce it to a shift reactor which uses sulfur-tolerant catalyst. The catalyst can hydrolyze carbonyl sulfide to hydrogen sulfide. Furthermore, the shift converter 68 can alter the hydrogen to carbon monoxide ratio ($H_2$:CO) in the raw syngas, as described above with reference to FIG. 2. Raw syngas can exit the shift converter 68 via line 146 and can be directed to a heat recovery unit 148. The heat recovery unit 148 can operate similarly to the heat recovery unit 124, and can cool the raw syngas via line 146 to produce raw syngas in line 152 and remove a condensate in line 150 which can include ammonia and hydrogen sulfide. The condensate via line 150 can be combined with the condensate via line 134, and directed to the ammonia purification unit 140, the saturation unit 143, removed from the system 100, or any combination thereof.

The raw syngas via line 152 can be introduced to the mercury removal unit 72, which can, as described above, remove and safely dispose of mercury contaminants in the raw syngas via line 152. In one or more embodiments, the mercury removal unit 72 can include molecular sieves and/or activated carbon disposed in devices such as filters which can absorb the mercury for disposal.

The raw syngas can exit the mercury removal unit 72 via line 17 and can be introduced to the syngas treatment system 5, e.g., to the AGRU 14. The raw syngas via line 17 can have methane concentration of from about 0 mol %, about 1 mol %, about 2 mol % or about 3 mol % to about 4 mol %, about 5 mol %, or about 6 mol %. The raw syngas via line 17 can have a carbon dioxide concentration of from about 1 mol %, about 5 mol %, about 30 mol %, about 35 mol %, or about 40 mol % to about 45 mol %, about 50 mol %, or about 55 mol %. The raw syngas via line 17 can have a carbon monoxide concentration of from about 1 mol %, about 1.5 mol %, or about 2 mol % to about 3 mol %, about 4 mol %, about 5 mol %, about 30 mol % or higher. The raw syngas via line 17 can have a diatomic hydrogen concentration of from about 40 mol %, about 45 mol %, or about 50 mol % to about 55 mol %, about 60 mol %, or about 65 mol %. The raw syngas via line 17 can have a diatomic nitrogen concentration of from about 0.05 mol %, about 0.075 mol %, or about 0.10 mol % to about 0.125 mol %, 0.15 mol %, or about 0.175 mol %. The raw syngas via line 17 can have a hydrogen cyanide concentration of from about 0.015 mol %, about 0.02 mol %, or about 0.025 mol % to about 0.035 mol %, about 0.04 mol %, or about 0.045 mol %. The raw syngas via line 17 can have a hydrogen sulfide concentration of from about 0.05 mol %, about 0.10 mol %, or about 0.13 mol % to about 0.15 mol %, about 0.175 mol %, or about 0.20 mol %. The raw syngas via line 17 can have an argon concentration of from about 0.04 mol %, about 0.05 mol %, or about 0.06 mol % to about 0.08 mol %, about 0.09 mol %, or about 0.10 mol %. The raw syngas via line 17 can have a flow rate of about 100,000 kg/hr, about 150,000 kg/hr, or about 200,000 kg/hr to about 250,000 kg/hr, about 300,000 kg/hr, or about 350,000 kg/hr. The raw syngas via line 17 can have a temperature of from about 55° C., about 60° C., or about 65° C. to about 70° C., about 75° C., or about 80° C. The raw syngas via line 17 can have a pressure of from about 25 bar, about 30 bar, or about 35 bar to about 40 bar, about 45 bar, or about 50 bar.

The AGRU 14 can separate one or more acid gases from the raw syngas, including carbon dioxide and hydrogen sulfide via line 154. The acid gases removed via line 154 can be introduced to a $CO_2$ compressor 157, which can be any compressor, or multiple compressors, desired. The compressed acid gas can exit the compressor 157 via line 159 and can be transported out of the gasification system 100, for use in other applications, for example, for later use in enhanced oil recovery processes.

In one or more embodiments, the acid gases removed via line 154 can have a methane concentration of from about 0.6 mol %, about 0.7 mol %, or about 0.8 mol % to about 0.9 mol %, about 1.0 mol %, or about 1.1 mol %. The acid gases removed via line 154 can have a carbon dioxide concentration of from about 70 mol %, about 75 mol %, or about 80 mol % to about 85 mol %, about 90 mol %, or about 95 mol %. The acid gases removed via line 154 can have a carbon monoxide concentration of from about 0.2 mol %, about 0.3 mol %, or about 0.4 mol % to about 0.6 mol %, about 0.7 mol %, or about 0.8 mol %. The acid gases removed via line 154 can have a hydrogen ($H_2$) concentration of from about 2.5 mol %, about 3.0 mol %, or about 3.5 mol % to about 4.0 mol %, about 4.5 mol %, or about 5.0 mol %. The acid gases removed via line 154 can have a water concentration of about 4 mol %, about 5 mol %, or about 6 mol % to about 8 mol %, about 9 mol %, or about 10 mol %. The acid gases removed via line 154 can have a nitrogen ($N_2$) concentration of from about 0.3 mol %, about 0.4 mol %, or about 0.5 mol % to about 0.7 mol %, about 0.8 mol %, or about 0.9 mol %. The acid gases removed via line 154 can have an ammonia concentration of from about 1.0 mol %, about 1.5 mol %, or about 2.0 mol %, to about 3.0 mol %, about 3.5 mol %, or about 4.0 mol %. The acid gases removed via line 154 can have a hydrogen cyanide concentration of from about 0.05 mol %, about 0.075 mol %, or about 0.10 mol % to about 0.125 mol %, about 0.15 mol %, or about 0.175 mol %. The acid gases removed via line 154 can have a hydrogen sulfide concentration of from about 0.30 mol %, about 0.35 mol %, or about 0.40 mol % to about 0.45 mol %, about 0.50 mol %, or about 0.55 mol %. The acid gases removed via line 154 can have an argon concentration of from about 0.6 mol %, about 0.7 mol %, or about 0.8 mol % to about 1.0 mol %, about 1.1 mol %, or about 1.2 mol %. The acid gas removed via line 154 can have a mass flow rate of from about 90,000 kg/hr, about 100,000 kg/hr, or about 120,000 kg/hr to about 140,000 kg/hr, about 150,000 kg/hr, or about 160,000 kg/hr. The acid gas removed via line 154 can have a temperature of from about 20° C., about 22.5° C., or about 25° C. to about 27.5° C., about 30° C., or about 32.5° C. The acid gas removed via line 154 can have a pressure of from about 0.8 bar, about 0.9 bar, or about 1.0 bar to about 1.2 bar, about 1.3 bar, or about 1.4 bar.

Referring again to the AGRU 14, a second, predominately $CO_2$ portion of the raw syngas via line 17 can also be removed via line 156. The second portion can be introduced to a compress and clean-up unit 158. In one or more embodiments, the compress and clean-up unit 158 can be integrated with the $CO_2$ compressor 157, or can be separate. In either of the exemplary cases, the compress and clean-up unit 158 can include any compressor and/or filtration devices suitable. The second portion can exit the compress and clean-up unit 158 via line 160.

In one or more embodiments, the second portion via line 160 can have a methane concentration of from about 0.08 mol %, about 0.10 mol %, or about 0.12 mol % to about 0.14 mol %, about 0.16 mol %, or about 0.18 mol %. The second portion via line 160 can have a carbon dioxide concentration of about 90 mol % or more, about 95 mol % or more, about 97 mol % or more, about 99 mol % or more, or about 99.5 mol % or more. The second portion via line 160 can have a carbon monoxide concentration of from about 0.03 mol %, about 0.04 mol %, or about 0.05 mol %, to about 0.07 mol %, about 0.08 mol %, or about 0.09 mol %. The second portion via line 160 can have a hydrogen ($H_2$) concentration of from about 0.15 mol %, about 0.17 mol %, or about 0.19 mol % to about 0.21 mol %, about 0.23 mol %, or about 0.25 mol %. The second portion via line 160 can have a mass flow rate of from about 85,000 kg/hr, about 90,000 kg/hr, about 95,000 kg/hr to about 105,000 kg/hr, about 110,000 kg/hr, or about 115,000 kg/hr. The second portion via line 160 can have a temperature of about 1.0° C., about 1.3° C., or about 1.6° C. to about 1.9° C., about 2.2° C., or about 2.5° C.

The raw syngas can exit the AGRU 14 via line 18, which can be connected to the purification unit 16. The raw syngas via line 18 can have a methane concentration of from about 3.25 mol %, about 3.5 mol %, about 3.75 mol % to about 4.0 mol %, about 4.25 mol %, about 4.5 mol %, or higher. The raw syngas via line 18 can have a carbon dioxide concentration of from about 1.2 mol %, about 1.7 mol %, or about 2.2 mol % to about 2.7 mol %, about 3.2 mol %, about 3.7 mol %, or higher. The raw syngas via line 18 can have a carbon monoxide concentration of from about 3.0 mol %, about 3.5 mol %, or about 4.0 mol % to about 4.5 mol %, about 5.0 mol %, or about 5.5 mol %, or higher. The raw syngas via line 18 can have a hydrogen ($H_2$) concentration of from about 75 mol %, about 80 mol %, or about 85 mol % to about 90 mol %, about 95 mol %, or about 99 mol %. The raw syngas via line 18 can have a nitrogen ($N_2$) concentration of from about 0.2 mol %, about 1.1 mol %, about 1.3 mol %, or about 1.5 mol % to about 1.7 mol %, about 1.9 mol %, or about 2.1 mol %. The raw syngas via line 18 can have an argon concentration of from about 0.2 mol %, about 0.3 mol %, or about 0.4 mol % to about 0.5 mol %, about 0.6 mol %, or about 0.7 mol %. The raw syngas via line 18 can have a mass flow rate of from about 30,000 kg/hr, about 35,000 kg/hr, or about 40,000 kg/hr to about 50,000 kg/hr, about 55,000 kg/hr, or about 60,000 kg/hr. The raw syngas via line 18 can have a temperature of from about 22.5° C., about 25° C., or about 27.5° C. to about 30° C., about 32.5° C., or about 35° C. The raw syngas via line 18 can have a pressure of from about 27.5 bar, about 30 bar, or about 32.5 bar to about 37.5 bar, about 40 bar, or about 42.5 bar.

The purification unit 16 can produce the syngas product via line 22 by removing a waste gas via line 20. In one or more embodiments, the waste gas in line 20 can have a hydrogen ($H_2$) concentration of from about 35 mol %, about 40 mol %, or about 45 mol % to about 46 mol %, about 50 mol %, or about 55 mol %. In one or more embodiments, the waste gas in line 20 can have a nitrogen ($N_2$) concentration of from about 4 mol %, about 5 mol %, or about 6 mol % to about 7 mol %, about 8 mol %, or about 9 mol %. In one or more embodiments, the waste gas in line 20 can have a methane concentration of from about 10 mol %, about 13 mol %, or about 16 mol % to about 17 mol %, about 20 mol %, or about 23 mol %. In one or more embodiments, the waste gas in line 20 can have an argon concentration of from about 0.5 mol %, about 1.0 mol %, or about 1.5 mol % to about 1.7 mol %, about 2.2 mol %, or about 2.7 mol %. In one or more embodiments, the waste gas in line 20 can have a carbon monoxide concentration of from about 10 mol %, about 13 mol %, or about 16 mol % to about 19 mol %, about 22 mol %, or about 25 mol %. In one or more embodiments, the waste gas in line 20 can have a carbon dioxide concentration of from about 6 mol %, about 8 mol %, or about 10 mol % to about 12 mol %, about 14 mol %, or about 16 mol %. In one or more embodiments, the waste gas via line 20 can have a mass flow rate of from about 20,000 kg/hr, about 25,000 kg/hr, or about 30,000 kg/hr to about 35,000 kg/hr, about 40,000 kg/hr, or about 45,000 kg/hr.

The waste gas via line 20 can be compressed, reformed, shifted, and/or otherwise processed into a recovered raw syngas via line 46, as described above with reference to FIG. 1. The recovered raw syngas via line 46 can be fed directly to the AGRU 14, or can be combined with the raw syngas via line 17 prior to introduction to the AGRU 14. In one or more embodiments, a second AGRU (not shown) can be included in the gasification system 100, such that the AGRU 14 is dedicated to the raw syngas in line 17, while the second AGRU is dedicated to the recovered raw syngas in line 174.

The syngas product can exit the purification unit 16 via line 22. In one or more embodiments, the syngas product via line 22 can be introduced to the one or ammonia synthesis units 178. In one or more embodiments, nitrogen ($N_2$) via line 180 can be introduced to the ammonia synthesis unit 178. Although not shown, in one or more embodiments, line 180 can be coupled to line 113, such that the ASU 56 provides at least a portion of the nitrogen introduced to the one or more ammonia synthesis units 178. In the one or more ammonia synthesis units 178, at least a portion of the hydrogen present in the syngas product via lines 22 and the nitrogen via line 180 can combine to provide an ammonia product via line 182. In one or more embodiments, unreacted hydrogen and/or nitrogen can be present in line 182. In one or more embodiments, the one or more ammonia synthesis units 178 can be conventional single or multi-pass converters using one or more magnetite catalysts. In one or more embodiments, the one or more ammonia synthesis units 178 can be single or multi-pass converters using one or more noble metal catalysts, or one or more catalysts based upon ruthenium, such as the ruthenium-based KAAP catalyst available from Kellogg Brown & Root. The use of one or more higher activity, noble metal, catalysts can allow the use of lower pressures within the ammonia synthesis loop, thereby permitting use of a single barrel ammonia compressor (not shown).

In one or more embodiments, the one or more ammonia synthesis units 178 can include any reactor or reactors intended to operate at elevated pressures and/or temperatures to convert at least a portion of a feed gas containing nitrogen and hydrogen to ammonia. In one or more embodiments, the one or more ammonia synthesis units 178 can include one or more "Split-Flow Ammonia Converters" as described in U.S. Pat. No. 7,081,230, the entirety of which is herein incorporated by reference, to the extent not inconsistent with this disclosure. In one or more embodiments, the one or more ammonia synthesis units 370 can include one or more "Isothermal Ammonia Converters" as described in U.S. Pat. No. 6,171,570, the entirety of which is herein incorporated by reference, to the extent not inconsistent with this disclosure. In one or more embodiments, the one or more ammonia synthesis units 178 can include one or more "Horizontal Ammonia Converter Adapted for High Activity Catalyst" as described in U.S. Pat. No. 6,132,687, the entirety of which is herein incorporated by reference, to the extent not inconsistent with this disclosure. In one or more embodiments, the one or more ammonia synthesis units 178 can include one or more ammonia converters as described in U.S. patent application Ser. No. 12/107,506, the entirety of which is herein incorporated by reference, to the extent not inconsistent with this disclosure.

In one or more embodiments, the ammonia synthesis unit 178 can include one or more ammonia condensers (not shown). In one or more embodiments, the one or more ammonia condensers can include any mechanical or chemical system capable of selectively separating ammonia from a gas mixture including at least hydrogen and nitrogen. In one or more embodiments, the one or more ammonia condensers can include one or more cryogenic purifiers containing one or more refrigeration exchangers and one or more refrigeration compressors. In the one or more ammonia condensers, the ammonia can be condensed and concentrated to provide an ammonia product via line 182. In one or more embodiments, the ammonia concentration of the ammonia product in line 182 can be about 85 mol %, about 90 mol %, about 95 mol %, about 99.9 mol %, or more. In one or more embodiments, the ammonia product in line 182 contain a maximum of about 15 mol %, about 10 mol %, about 5 mol %, or about 0.1 mol %, or less of combined hydrogen and nitrogen. The ammonia product in line 182 can have a mass flow rate of from about 60,000 kg/hr, about 65,000 kg/hr, or about 70,000 kg/hr to about 75,000 kg/hr, about 80,000 kg/hr, or about 85,000 kg/hr. The ammonia via line 182 can have a temperature of from about 42° C., about 45° C., or about 47.5° C. to about 52.5° C., about 55° C., or about 57.5° C.

A purge gas via line 184 can exit the ammonia plant 178 and can be directed to a separation unit 186. An ammonia and/or hydrogen gas portion of the purge gas can be recovered using the separation unit 186. The separation unit 186 can be or include, for example, a filter, a pressure swing adsorption unit, a condenser, a flashing unit, or any other device operable to remove at least hydrogen gas and/or ammonia from the purge gas to form a recovered purge gas and leave a reject gas. The recovered purge gas can be reintroduced via line 188 to the ammonia synthesis unit 178 for further processing, and/or combined with the syngas product via line 22. The reject gas via line 190 can exit the gasification system 100.

In one or more embodiments, the reject gas via line 190 can have a methane concentration of from about 5 mol %, about 6 mol %, or about 7 mol % to about 8 mol %, about 9 mol %, or about 10 mol %. The reject gas via line 190 can have a diatomic hydrogen concentration of from about 20 mol %, about 22 mol %, or about 24 mol % to about 26 mol %, about 28 mol %, or about 30 mol %. The reject gas via line 190 can have a diatomic nitrogen concentration of from about 55 mol %, about 60 mol %, or about 65 mol % to about 70 mol %, about 75 mol %, or about 85 mol %. The reject gas via line 190 can have an ammonia concentration of less than about 0.05 mol %, about 0.04 mol %, about 0.03 mol %, or about 0.02 mol %. The reject gas via line 190 can have an argon concentration of from about 2 mol %, about 3 mol %, or about 4 mol % to about 5 mol %, about 6 mol %, or about 7 mol %. The reject gas via line 190 can have a mass flow rate of about 2,250 kg/hr, about 2,500 kg/hr, or about 2,750 kg/hr to about 3,000 kg/hr, about 3,250 kg/hr, or about 3,500 kg/hr. The reject gas via line 190 can have a temperature of from about 40° C., about 45° C., or about 50° C. to about 60° C., about 65° C., or about 70° C. The reject gas via line 190 can have a pressure of from about 1 bar, about 2 bar, about 2.5 bar to about 3.5 bar, about 4 bar, or about 5 bar.

In one or more embodiments, the ammonia via line 182 can be introduced to the ammonia derivative plant 144. Although not shown, in at least one specific embodiment, the ammonia via line 182 can also or instead be combined with the ammonia via line 142 produced in the ammonia recovery system described above. The ammonia derivative plant 144 can employ any suitable processes, systems, and devices to produce ammonia-derived products, such as a urea product via line 192. In one or more embodiments, the urea product via line 192 can be essentially pure urea. For example, the urea product via line 192 can have a urea concentration of about 95 mol % or more, about 99 mol % or more, about 99.9 mol % or more, about 99.99 mol % or more, about 99.999 mol % or more.

Figure 4:
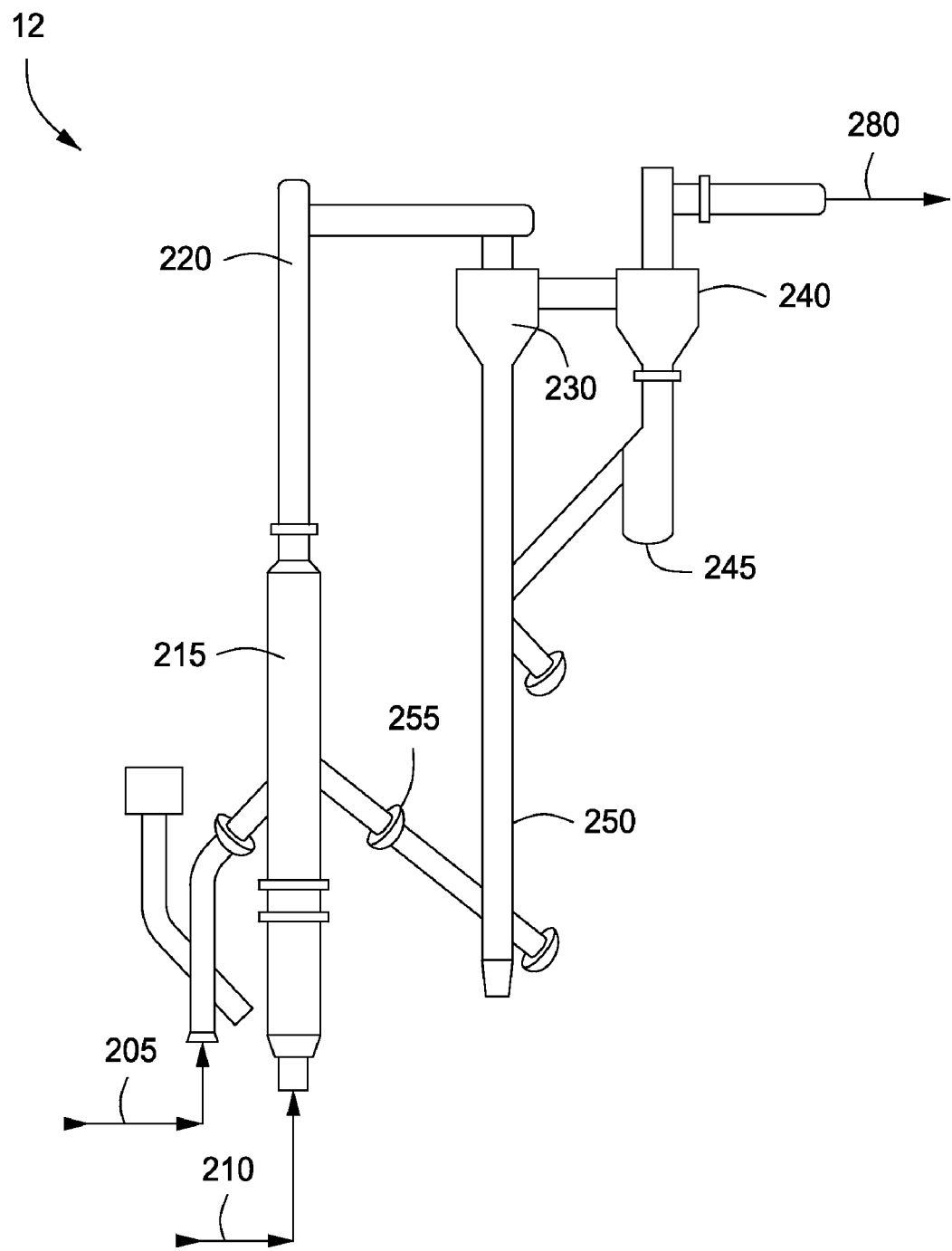
FIG. 4 depicts a gasifier, according to one or more embodiments described.

FIG. 4 depicts an illustrative gasifier 12, according to one or more embodiments. The gasifier 12 can include a single reactor train or two or more reactor trains arranged in series or parallel. Each reactor train can include one or more mixing zones 215, risers 220, and disengagers 230, 240. Each reactor train can be configured independently from the others or configured where any of the one or more mixing zones 215, risers 220, disengagers 230, 240 can be shared. For simplicity and ease of description, embodiments of the gasifier 12 will be described herein with reference to a single reactor train; however, it will be appreciated that any number of reactor trains can be added without departing from the scope of the disclosure.

In one or more embodiments, the hydrocarbon feedstock via line 210 and one or more oxidants via line 205 can be combined in the mixing zone 215 to provide a gas suspension. In one or more embodiments, the feedstock and oxidant can be injected separately, as shown, to the mixing zone 215 or mixed prior to injection into the mixing zone (not shown). In one or more embodiments, the hydrocarbon feedstock and oxidant can be injected sequentially into the gasifier 12. In one or more embodiments, the hydrocarbon feedstock and oxidant can be injected simultaneously into the gasifier 12. The feed (i.e., introduction of the feedstock and oxidant) to the gasifier 12 can be continuous, sequential, or intermittent depending on desired product types and grades.

The gas suspension can move upward through the mixing zone 215 to the riser 220 where additional residence time can allow the char gasification, methane/steam reforming, tar cracking, and/or water-gas shift reactions to occur. The riser 220 can operate at a higher temperature than the mixing zone 215, and can have a smaller diameter than the mixing zone 215. In one or more embodiments, the superficial gas velocity in the riser 220 can range from about 10 ft/s to about 90 ft/s, from about 20 ft/s to about 80 ft/s, from about 30 ft/s to about 70 ft/s, from about 30 ft/s to about 40 ft/s, or from about 35 ft/s to about 60 ft/s. Temperatures in the riser 220 can range from about 315° C., about 415° C., or about 515° C. to about 900° C., about 1000° C., or about 1100° C.

The gas mixture can exit the riser 220 and enter the disengagers 230, 240, where the larger particulates can be separated from the gas and recycled back to the mixing zone 215 via one or more conduits, including, but not limited to, a standpipe 250, and/or j-leg 255. The j-leg 255 can include a non-mechanical "j-valve" to increase the effective solids residence time, increase the carbon conversion, and minimize aeration requirements for recycling solids to the mixing zone 215. In one or more embodiments, the disengagers 230, 240 can be cyclones. In one or more embodiments, one or more particulate transfer devices 245, such as one or more loop seals, can be located downstream of the disengagers 230, 240 to collect separated particulate fines. Any entrained or residual particulates in the raw syngas stream via line 280 produced by the gasifier 12 can be removed using the one or more particulate removal systems (not shown).

In one or more embodiments, the average particle diameter size of the hydrocarbon feedstock can be used as a control variable to optimize particulate density of the solids recycled to the mixing zone via the standpipe 250. In one or more embodiments, the hydrocarbon feedstock particle size can be varied to optimize the particulate mass circulation rate, and to improve the flow characteristics of the gas mixture within the mixing zone 215 and riser 220.

One or more sorbents can also be added to the gasifier 12. In one or more embodiments, the sorbents can be added to capture contaminants from the raw syngas, such as sodium vapor in the gas phase within the gasifier 12. In one or more embodiments, the sorbents can be added to scavenge oxygen at a rate and level sufficient to delay or prevent the oxygen from reaching a concentration that can result in undesirable side reactions with hydrogen (e.g., water) from the feedstock in the mixing zone 215. In one or more embodiments, the sorbents can be used to dust or coat feedstock particles in the gasifier to reduce the tendency for the particles to agglomerate. In one or more embodiments, the one or more oxidants can be introduced at the bottom of the mixing zone 215 to increase the temperature within the mixing zone 215 and riser 220 by combusting any carbon contained within the recirculated particulates to form an ash ("char"). In one or more embodiments, the sorbents can be ground to an average particle size of about 5 microns to about 100 microns, or about 10 microns to about 75 microns. Illustrative sorbents can include but are not limited to carbon-rich ash, limestone, dolomite, and coke breeze. Residual sulfur released from the feedstock can be captured by native calcium in the feed or by a calcium-based sorbent to form calcium sulfide.

In one or more embodiments, the one or more oxidants can be introduced into the mixing zone 215 at a rate suitable to control the temperature of the mixing zone 215. In one or more embodiments, the one or more oxidants can include excess air. In one or more embodiments, the one or more oxidants can be sub-stoichiometric air, where the molar ratio of oxygen to carbon can be maintained at a sub-stoichiometric concentration to favor the formation of carbon monoxide over carbon dioxide in the mixing zone 215. In one or more embodiments, the oxygen supplied via the oxidant to the mixing zone 215 can be less than five percent of the stoichiometric amount of oxygen required for complete combustion of all the carbon supplied to the mixing zone 215. Excess oxygen and steam in the air can be consumed by the recirculating solids stabilizing reactor temperature during operation and periods of feed interruption if any.

The residence time and temperature in the gasifier 12 can be sufficient for water-gas shift reaction to reach equilibrium. In one or more embodiments, the residence time of the feedstock in the mixing zone 215 can be greater than about 2 seconds. In one or more embodiments, the residence time of the feedstock in the mixing zone 215 can be greater than about 5 seconds. In one or more embodiments, the residence time of the feedstock in the mixing zone 215 can be greater than about 10 seconds. In one or more embodiments, the operating temperature of the gasifier 12 can range from about 260° C., about 400° C., or about 540° C. to about 650° C., about 815° C., or about 1000° C. In one or more embodiments, the operating temperature of the gasifier 12 can range from about 370° C. to about 955° C. In one or more embodiments, the operating temperature of the gasifier 12 can range from about 480° C. to about 875° C. In one or more embodiments, the operating temperature of the gasifier 12 can range from about 650° C. to about 875° C.

In one or more embodiments, the gasifier 12 can be operated in a temperature range that can avoid melting the ash, such as from about 560° C. to about 1040° C., or from about 835° C. to about 935° C. Heat can be supplied by burning the carbon in the recirculated solids in the lower part of the mixing zone 215 before recirculated solids contact the entering feedstock. In one or more embodiments, start-up can be initiated by bringing the mixing zone 215 to a temperature from about 510° C. to about 650° C., and, optionally, by feeding coke breeze or the equivalent to the mixing zone 215 to further increase the temperature of the mixing zone 215 to about 900° C.

In one or more embodiments, the operating temperature of the gasifier 12 can be controlled by the recirculation rate and residence time of the solids within the riser 220; by reducing the temperature of the ash prior to recycle to the mixing zone 215; by the addition of steam to the mixing zone 215; and/or by the addition of oxidant to the mixing zone 215. The recirculating solids also can serve to rapidly heat the incoming hydrocarbon feedstock, which can also minimize tar formation.

In one or more embodiments, the mixing zone 215 can be operated at pressures from about 0 psig to about 650 psig to increase thermal output per unit reactor cross-sectional area and enhance energy output in any subsequent power cycle. In one or more embodiments, the mixing zone 215 can be operated at pressures from about 100 psig to about 550 psig. In one or more embodiments, the mixing zone 215 can be operated at pressures from about 100 psig to about 450 psig. In one or more embodiments, the mixing zone 215 can be operated at pressures from about 100 psig to about 350 psig.

In one or more embodiments, the raw syngas via line 280 produced in the gasifier 12 can include carbon monoxide, hydrogen, oxygen, hydrocarbons, sulfur, solids, mixtures thereof, derivatives thereof or combinations thereof. In one or more embodiments, the raw syngas produced in the gasifier 12 can be essentially nitrogen-free. In one or more embodiments, the process converts at least about 85%, or 90%, or 95%, or 98%, or 99% of the carbon from the hydrocarbon feedstock to raw syngas.

In one or more embodiments, the raw syngas via line 280 produced in the gasifier 12 can contain from about 5 vol %, about 15 vol %, or about 20 vol % to about 30 vol %, about 40 vol %, or about 50 vol % carbon monoxide. The raw syngas can contain from about 5 vol % or about 10 vol % to about 20 vol % or about 25 vol % hydrogen. The raw syngas can contain from about 0.5 vol % to about 2.0 vol % or about 3.0 vol % nitrogen. The raw syngas can contain from about 1 vol %, or about 5 vol % to about 10 vol %, about 15 vol %, or about 20 vol % methane. The raw syngas can contain less than about 30 vol %, about 25 vol %, about 20 vol %, about 15 vol %, or about 10 vol % carbon dioxide. In one or more embodiments, the synthesis gas leaving the gasifier 12 can have a heating value, corrected for heat losses and dilution effects, of from a low of about 50 Btu/scf to a high of about 75 Btu/scf, about 100 Btu/scf, about 110 Btu/scf, about 140 Btu/scf, about 180 Btu/scf, about 200 Btu/scf, about 250 Btu/scf, about 275 Btu/scf, or higher.

Steam can be supplied to the gasifier 12 to control the hydrogen to carbon monoxide ratio ($H_2$:CO) in the gasifier 12. Since the outlet temperature of the gasifier 12 can be proportionately less than at least some other gasifiers (e.g., slag-type), the amount of thermal heat versus chemical heat in the raw syngas via line 280 can be comparably less in the gasifier 12. Therefore, steam can be used to adjust by shift the $H_2$:CO ratio with a smaller energy penalty than in at least some other entrained flow gasifiers operating at higher temperatures. Because of the reduced operating temperature within the gasifier (e.g., less than about 1600° C.), less energy can be consumed to control and optimize the $H_2$:CO ratio. Thus, the production of hydrogen can be increased without a commensurate increase in steam demand within the gasifier 12. For example, the raw syngas via line 280 leaving the gasifier 12 can have a $H_2$:CO of at least about 0.2, or at least about 0.5. In one or more embodiments, the $H_2$:CO ratio can be from about 0.25 to about 2.5, from about 0.4 to about 2.0, from about 0.5 to about 1.5, or from about 0.8 to about 1.0.

EXAMPLES

The foregoing discussion can be further described with reference to the following non-limiting examples. In one example, the syngas treatment system 5 (FIG. 1) can be implemented in the gasification system 100 (FIG. 3), which can be designed to produce ammonia and ammonia-derived products. The gasification system 100 can be fed coal via line 104 with the coal having approximately the following weight composition: 41.59 wt % carbon, 2.34 wt % hydrogen, 1.05 wt % nitrogen, 0.32% sulfur, 20.00 wt % $H_2O$, 25.00 wt % ash, with a higher heating value of about 16.2 MJ/kg, although it will be appreciated that a wide variation in coal feed via line 104 can be used without departing from the scope of this disclosure. The gasification system 100 can have approximately the simulated values contained in Table 2, each of which is keyed to the reference numerals show in and described above with reference to FIG. 3.

TABLE 2

| Composition (mol %) | 102 | 105A | 122 | 124 | 17 | 18 | 20 | 190 | 182 | 192 | 154 | 160 | 38A |
|---|---|---|---|---|---|---|---|---|---|---|---|---|---|
| CH4 | | 0.00 | 3.59 | | 3.30 | 3.95 | 16.6 | 7.65 | 0.00 | 0.00 | 0.84 | 0.13 | 0.00 |
| CO2 | | 0.00 | 18.08 | | 42.84 | 2.50 | 10.9 | 0.00 | 0.00 | 0.00 | 84.56 | 99.61 | 0.00 |
| CO | | 0.00 | 33.18 | | 2.32 | 4.23 | 18.5 | 0.00 | 0.00 | 0.00 | 0.52 | 0.06 | 0.00 |
| H2 | | 0.00 | 24.73 | | 50.97 | 87.27 | 45.8 | 21.66 | 0.00 | 0.00 | 3.87 | 0.20 | 0.00 |
| H2O | | 0.00 | 19.41 | | 0.22 | 0.00 | | 0.00 | 0.00 | 0.00 | 7.00 | 0.00 | 0.00 |
| N2 | | 0.15 | 0.12 | | 0.11 | 1.62 | 6.6 | 66.36 | 0.00 | 0.00 | 0.06 | 0.00 | 0.15 |
| NH3 | | 0.00 | 0.62 | | 0.00 | 0.00 | | 0.02 | 100.00 | 0.00 | 2.51 | 0.00 | 0.00 |
| HCN | | 0.00 | 0.04 | | 0.03 | 0.00 | | 0.00 | 0.00 | 0.00 | 0.12 | 0.00 | 0.00 |
| H2S | | 0.00 | 0.15 | | 0.14 | 0.00 | | 0.00 | 0.00 | 0.00 | 0.43 | 0.00 | 0.00 |
| COS | | 0.00 | 0.01 | | | 0.0000 | | 0.00 | 0.00 | 0.00 | 0.00 | 0.00 | 0.00 |
| Ar | | 0.35 | 0.08 | | 0.07 | 0.43 | 1.6 | 4.31 | 0.00 | 0.00 | 0.09 | 0.00 | 0.35 |
| O2 | | 99.50 | 0.00 | | 0.00 | 0.00 | | 0.00 | 0.00 | 0.00 | 0.00 | 0.00 | 99.50 |
| Urea | | 0.00 | 0.00 | | 0.00 | 0.00 | | 0.00 | 0.00 | 100.00 | 0.00 | 0.00 | 0.00 |
| Mass Flow rate (kg/hr) | 166,344 | 80,691 | 353,846 | 42,970 | 235,239 | 45,318 | 31,342 | 2,865 | 73,750 | 130,625 | 153,692 | 99,240 | 6,683 |
| Temp (° C.) | 37.7 | 27.0 | 325.6 | Ambient | 65.6 | 29.0 | | 55.0 | 50.0 | | 27.0 | 1.7 | 150.0 |
| Pressure (bar) | 45.8 | 45.8 | 45.8 | 1.0 | 36.0 | 35.0 | | 3.0 | 21.0 | | 1.1 | 1.1 | 38.7 |

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A gasification system, comprising:
a gasifier that produces a raw syngas;
a purification unit fluidly coupled to the gasifier, wherein the purification unit receives the raw syngas from the gasifier and produces a waste gas and a syngas product;
a first reformer fluidly coupled to the purification unit, wherein the first reformer receives a first portion of the waste gas and produces a reformed hydrocarbon; and
a second reformer having a first inlet fluidly coupled to the purification unit, a second inlet fluidly coupled to the first reformer, and an outlet fluidly coupled to the purification unit, wherein the second inlet receives the reformed hydrocarbon from the first reformer, the first inlet receives a second portion of the waste gas from the purification unit, and the second reformer produces a recovered raw syngas that is directed to the purification unit via the outlet.

2. The gasification system of claim 1, further comprising a compressor coupled to the purification unit and to at least one of the first and second reformers, wherein the compressor receives the waste gas from the purification unit and provides at least one of the first and second portions of the waste gas to at least one of the first and second reformers, respectively.

3. The gasification system of claim 1, wherein the first reformer is an autothermal reformer, and the second reformer is a shell-and-tube reformer.

4. The gasification system of claim 1, wherein the waste gas has a hydrogen concentration ranging from about 35 mol % to about 55 mol %, a nitrogen concentration ranging from about 4 mol % to about 9 mol %, a methane concentration ranging from about 10 mol % to about 23 mol %, an argon concentration ranging from about 0.5 mol % to about 2.7 mol %, a carbon monoxide concentration ranging from about 10 mol % to about 25 mol %, and a carbon dioxide concentration ranging from about 6 mol % to about 16 mol %.

5. The gasification system of claim 1, further comprising an air compressor fluidly coupled to the gasifier, wherein the air compressor provides air to the gasifier.

6. The gasification system of claim 1, further comprising an air separation unit fluidly coupled to the gasifier and having an air intake, wherein the air separation unit removes a nitrogen portion from air received via the air intake to produce an oxidant, wherein at least a portion of the oxidant is introduced to the gasifier.

7. The gasification system of claim 6, wherein the air separation unit is fluidly coupled to the first reformer and provides a second portion of the oxidant to the first reformer.

8. The gasification system of claim 7, wherein the oxidant has a nitrogen concentration ranging from about 0.10 mol % to about 0.20 mol %, an argon concentration ranging from about 0.20 mol % to about 0.40 mol %, and an oxygen concentration ranging from about 90 mol % to about 99.7 mol %.

9. The gasification system of claim 6, further comprising an ammonia synthesis unit fluidly coupled to the purification unit and the air separation unit, wherein the ammonia synthesis unit receives at least a hydrogen portion of the syngas product from the purification unit and at least a portion of the nitrogen portion from the air separation unit, wherein the ammonia synthesis unit is configured to produce an ammonia product.

10. The gasification system of claim 9, further comprising an ammonia recovery system including a condenser fluidly coupled to the gasifier, wherein the condenser receives a portion of the raw syngas from the gasifier and removes an ammonia portion therefrom to produce an ammonia-depleted syngas which is introduced to the gasifier.

11. A system for gasifying a hydrocarbon, comprising:
a gasifier that receives the hydrocarbon and produces a raw syngas;
an acid gas removal unit fluidly coupled to the gasifier, wherein the acid gas removal unit receives the raw syngas from the gasifier;
a purification unit fluidly coupled to the acid gas removal unit, wherein the purification unit receives the raw syngas from the acid gas removal unit and produces a waste gas and a syngas product;
a compressor fluidly coupled to the purification unit, wherein the compressor receives the waste gas from the purification unit and produces a compressed waste gas;
an autothermal reformer fluidly coupled to the compressor, wherein the autothermal reformer receives a first portion of the compressed waste gas and an oxidant, and produces a reformed hydrocarbon; and
a shell-and-tube reformer fluidly coupled to the compressor, the autothermal reformer, and the acid gas removal unit, wherein the shell-and-tube reformer receives the reformed hydrocarbon from the autothermal reformer and a second portion of the compressed waste gas from the compressor and produces a recovered raw syngas that is directed to the acid gas removal unit.

12. The system of claim 11, further comprising:
an air separation unit fluidly coupled to the gasifier, the autothermal reformer, or both to provide oxidant thereto;
an ammonia synthesis unit fluidly coupled to the purification unit and the air separation unit, wherein the ammonia synthesis unit receives the syngas product from the purification unit and nitrogen from the air separation unit and produces an ammonia product;
a separation unit fluidly coupled to the ammonia synthesis unit, wherein the separation unit receives a purge gas from the ammonia synthesis unit and separates the purge gas into a reject gas and a recovered purge gas, wherein the recovered purge gas includes hydrogen and ammonia and is directed back to the ammonia synthesis unit; and
an ammonia recovery system including a condenser fluidly coupled to the gasifier, wherein the condenser receives a portion of the raw syngas from the gasifier and removes an ammonia portion of the raw syngas to produce an ammonia-depleted syngas, wherein at least a portion of the ammonia portion is mixed with at least a portion of the ammonia product from the ammonia synthesis unit, and the ammonia-depleted syngas is channeled to the gasifier.

* * * * *